United States Patent
Lovmand et al.

(10) Patent No.: US 8,694,173 B2
(45) Date of Patent: Apr. 8, 2014

(54) CONTROL OF A WIND POWER PLANT

(75) Inventors: Bo Lovmand, Hadsten (DK); Søren Dalsgaard, Hadsten (DK)

(73) Assignee: Vestas Wind Systems A/S, Aarhus N. (DK)

(*) Notice: Subject to any disclaimer, the term of this patent is extended or adjusted under 35 U.S.C. 154(b) by 0 days.

(21) Appl. No.: 13/194,108

(22) Filed: Jul. 29, 2011

(65) Prior Publication Data

US 2011/0301769 A1 Dec. 8, 2011

Related U.S. Application Data

(60) Provisional application No. 61/414,438, filed on Nov. 17, 2010.

(30) Foreign Application Priority Data

Nov. 17, 2010 (DK) .................................. 2010 70357

(51) Int. Cl.
H02P 9/04 (2006.01)

(52) U.S. Cl.
USPC ........... 700/287; 700/286; 700/295; 700/296; 700/297; 290/44; 290/55; 322/44; 702/182

(58) Field of Classification Search
USPC ............................................ 700/287; 290/44
See application file for complete search history.

(56) References Cited

U.S. PATENT DOCUMENTS

| | | | |
|---|---|---|---|
| 7,119,452 B2* | 10/2006 | Larsen | 290/55 |
| 7,531,911 B2* | 5/2009 | Rivas et al. | 290/44 |
| 7,761,190 B2* | 7/2010 | Delmerico et al. | 700/297 |
| 7,898,100 B2* | 3/2011 | Andersen et al. | 290/44 |
| 8,095,244 B2* | 1/2012 | Morjaria et al. | 700/287 |
| 8,128,362 B2* | 3/2012 | Andersen et al. | 416/1 |
| 8,321,062 B2* | 11/2012 | Nies et al. | 700/287 |

(Continued)

FOREIGN PATENT DOCUMENTS

| | | |
|---|---|---|
| EP | 1571746 A1 | 9/2005 |
| EP | 1672779 A2 | 6/2006 |
| EP | 1739824 A2 | 1/2007 |

OTHER PUBLICATIONS

Tarnowski et al, "Regulation and Frequency Response Service Capability of Modern Wind Power Plants", Jul. 29, 2010, IEEE, pp. 1-8.*

(Continued)

Primary Examiner — Ryan Jarrett
Assistant Examiner — Olvin Lopez Alvarez
(74) Attorney, Agent, or Firm — Patterson & Sheridan, LLP (57) ABSTRACT

Methods for controlling a wind power plant that includes a plurality of wind turbines being operatively connected to a plant collector grid a power plant controller, a wind power plant, and a computer program product. The method may include generating an actual power reference signal in response to a determination of the power production of the wind power plant and comparing a desired power reference signal with the actual power reference signal. The method may include either applying a first filter characteristic as part of a generation of a wind turbine power reference if the desired power reference signal exceeds the actual power reference signal, or applying a second filter characteristic as part of the generation of the wind turbine power reference if the actual power reference signal exceeds the desired power reference signal. The first filter characteristic is different from the second filter characteristic.

20 Claims, 7 Drawing Sheets

(56) References Cited

U.S. PATENT DOCUMENTS

| | | | |
|---|---|---|---|
| 8,406,934 B2* | 3/2013 | Llorente Gonzalez et al. | 700/287 |
| 2007/0085343 A1* | 4/2007 | Fortmann | 290/44 |
| 2008/0111380 A1* | 5/2008 | Delmerico et al. | 290/44 |
| 2008/0116690 A1 | 5/2008 | Kabatzke et al. | |
| 2009/0055030 A1* | 2/2009 | Mayor et al. | 700/287 |
| 2009/0212563 A1* | 8/2009 | Morjaria | 290/44 |
| 2010/0123428 A1* | 5/2010 | Wu et al. | 320/102 |
| 2010/0138058 A1* | 6/2010 | Kirchner et al. | 700/286 |
| 2010/0145533 A1* | 6/2010 | Cardinal et al. | 700/291 |
| 2010/0237618 A1* | 9/2010 | Arinaga et al. | 290/44 |
| 2011/0081226 A1* | 4/2011 | Wobben | 415/1 |
| 2011/0101691 A1* | 5/2011 | Hashimoto et al. | 290/44 |
| 2011/0126206 A1* | 5/2011 | Kato et al. | 718/103 |
| 2011/0178771 A1* | 7/2011 | Miranda | 702/182 |
| 2011/0182712 A1* | 7/2011 | Nayebi et al. | 415/15 |
| 2011/0204635 A1* | 8/2011 | Miller | 290/44 |
| 2011/0215577 A1* | 9/2011 | Martin Da Silva et al. | 290/44 |
| 2011/0241343 A1* | 10/2011 | Petter | 290/44 |
| 2011/0285130 A1* | 11/2011 | Thisted | 290/44 |

OTHER PUBLICATIONS

EirGrid "Eirgride Grid Code, Version 3.3", Jan. 2009, pp. 26.*

Sorensen et al, "Wind Farm and COntrol Strategies", Aug. 2005, pp. 63.*

Danish Patent and Trademark Office, Search Report issued in related Danish Application No. PA 2010 70357 dated Apr. 7, 2011.

Hansen, et al., "Centralised power control of wind farm with doubly fed induction generators", Renewable Energy, Pergamon Press, Oxford, GB, vol. 31, No. 7, Jun. 1, 2006, pp. 935-951.

European Patent Office, International Search Report and Written Opinion issued in related International Application No. PCT/DK2011/050290 dated Nov. 3, 2011.

* cited by examiner

CONTROL OF A WIND POWER PLANT

CROSS-REFERENCE TO RELATED APPLICATIONS

This application claims the benefit of U.S. Provisional Application No. 61/414,438, filed Nov. 17, 2010, and claims priority under 35 U.S.C. §119 to Danish Patent Application No. PA 2010 70357, filed Aug. 12, 2010. The content of each of these applications is hereby incorporated by reference herein in its entirety for all purposes.

FIELD OF THE INVENTION

The present invention relates to a method for controlling a wind power plant comprising a plurality of wind turbines. The invention moreover relates to a controller for carrying out the method of invention and to a wind power plant.

BACKGROUND OF THE INVENTION

Wind turbines and wind power plants, also known as wind parks or wind farms, receive increased attention as environmentally safe and relatively inexpensive alternative energy sources. With this growing interest, considerable efforts are being made to develop wind power plants that are reliable and efficient.

A wind turbine generally includes a rotor having multiple blades. The rotor is mounted to a housing or nacelle which is positioned on top of a tower. Wind turbines may have large rotors (e.g. 40 or more meters in length). In addition, the towers are typically at least 60 meters in height. Blades on these rotors transform wind energy into a rotational torque or force that drives one or more generators. The wind turbine is configurable to provide a variable amount of power. A plurality of wind turbines may be grouped into a wind power plant configurable to provide a variable amount of power. The wind power plant typically also comprises a power plant controller capable of communicating with the plurality of wind turbines to adjust the amount of power generated by each of the wind turbines. The wind power plant may also comprise substation equipment, e.g. compensation equipment in the form of i.e. STATCOMs, capacitor banks.

SUMMARY OF THE INVENTION

The power from the wind power plant may be measured by a grid meter at or close to a point of common coupling between the wind power plant and a grid. The power measured by the grid meter may be compared with the power requested. Such power request may originate from grid codes, a utility network, a customer or from a SCADA network monitoring the wind power plant, e.g. due to protection of the wind turbines or other equipment of the wind power plant.

In certain cases, e.g. in case of increasing grid frequency or generally low demand for power on the grid, if the wind power plant owner does not have permission to generate at full capacity, in order to let the wind power plant produce the foreseen power, instructions are given to the wind power plant to derate the output thereof, i.e. lower the power production from the wind power plants.

A wind power plant may arranged to handle derate instructions by using a first power control setup including information regarding the capabilities of each wind turbine in the wind power plant. In the first power control setup, the information on the capabilities of the active power of the individual wind turbine includes a maximum setpoint, which is the equal to the nominal power of the wind turbine. A disadvantage by the first control setup is that when an instruction to derate the output from the wind turbine is sent from the power plant controller to the wind turbine, a delay occurs before the wind turbine has actually been able to reduce its output power accordingly. At some wind power plants, this delay is not acceptable or allowed.

To overcome the above disadvantage of the first power control setup, a wind power plant may be arranged to handle derate instructions by using a second power control setup, also including information regarding the capabilities of each wind turbine in the power plant. In the second power control setup, the information on the capabilities of the active power of the individual wind turbines includes a maximum setpoint, which is set to be equal to the available power of the wind turbine, which depends on the current wind speed. The benefit of this second power control setup is that when the wind power plant receives an instruction to lower the output power, the wind power plant reacts substantially immediately. However, the second power control setup has disadvantages in that production may be lost due to power setpoints not being updated. If the wind speed has increased since the latest power setpoint was received by the wind turbine, the wind turbine cannot increase its production to the currently available power. Moreover, the second power control setup may induce increased loads on components of the wind turbines, e.g. the blades, main shaft, gearbox.

Hence, an improved a method for controlling a wind power plant would be advantageous, and in particular a control method with low delay and high power output would be advantageous.

Accordingly, the invention preferably seeks to mitigate, alleviate or eliminate one or more of the above mentioned disadvantages singly or in any combination. In particular, it may be seen as an object of the present invention to provide a control method for controlling a wind power plant that solves the above mentioned problems in relation to delay in reaction of the wind power plant and in relation to lost production due to outdated maximum allowed output power.

This object and several other objects are obtained in a first aspect of the invention by providing a method for controlling a wind power plant comprising a plurality of wind turbines being operatively connected to a plant collector grid, the method comprising the steps of providing a desired power reference signal; determining the power production of the wind power plant, and generating an actual power reference signal in response thereto; comparing the desired power reference signal with the actual power reference signal, and performing one of the following steps: 1) applying a first filter characteristic as part of a generation of a wind turbine power reference if the desired power reference signal exceeds the actual power reference signal, or 2) applying a second filter characteristic as part of the generation of the wind turbine power reference if the actual power reference signal exceeds the desired power reference signal, wherein the first filter characteristic is different from the second filter characteristic. Thus, the method according to the invention proposes to compare the desired power reference signal and the actual power reference signal, and use an appropriate filter characteristic in dependency of the comparison. Hereby, an optimized control may be used in dependency on whether the desired power reference signal is larger or smaller than the actual power reference signal. If the wind power plant receives an instruction to derate the output to below the actual power reference signal, the second filter characteristic is used, whilst the first filter characteristic is used in the event that the wind power plant in unconstrained.

Advantageously, the first filter characteristic comprises a maximum setpoint curve corresponding substantially to the nominal power of the wind turbine. This corresponds to an unconstrained control of the wind turbine, in the sense that no external input from e.g. the utility grid requires that the wind turbine outputs less than its nominal power.

Moreover, the second filter characteristic comprises a maximum setpoint curve depending on the actual power produced by the wind turbine; advantageously, the maximum setpoint curve of the second filter characteristic depends on the average actual power produced by the wind turbine over a predetermined amount of time. Alternatively, the second filter characteristic comprises a maximum setpoint curve corresponding to the available power for the wind turbine. These are examples rendering it possible to, on receipt of a derate instruction, to make the wind turbines react quickly so that the reduction of power output from the wind power plant may be initiated immediately.

Typically, both the first and second filter characteristics comprise a minimum setpoint curve depending on a prevailing wind speed.

The method of the invention may apply the first filter characteristic as part of the wind turbine power reference if the actual power reference signal equals the desired power reference signal. Alternatively, the method of the invention may apply the second filter characteristic as part of the wind turbine power reference if the actual power reference signal equals the desired power reference signal.

The setpoint of the filter characteristics may relate to one or more of the following: wind turbine active power, wind turbine reactive power, wind turbine grid voltage, wind turbine power factor and wind turbine grid frequency. Thus, the chosen filter characteristic sent out from the power plant controller to the individual wind turbines gives a setpoint relating to one or more of the above features; when such setpoints are sent to all wind turbines within the wind power plant, one or more of the following are controlled: wind power plant active power, wind power plant reactive power, wind power plant voltage, wind power plant power factor and wind power plant frequency.

In a second aspect, the invention relates a wind power plant controller arranged for carrying out the method of any of the invention. In a third aspect, the invention relates to a wind power plant comprising a plurality of wind turbines being operatively connected to a plant collector grid, the wind power plant being arranged for carrying out the method of the invention.

In a fourth aspect, the invention relates to a computer program product being adapted to enable a power plant controller system comprising at least one processor having data storage means associated therewith to control the wind turbines of a wind power plant according to the first aspect of the invention.

This fourth aspect of the invention is particularly, but not exclusively, advantageous in that the present invention may be implemented by a computer program product enabling a power plant controller or a SCADA system to perform the operations of the first aspect of the invention. Thus, it is contemplated that an existing power plant controller or SCADA system may be changed to operate according to the present invention by installing a computer program product on a power plant controller or on a SCADA system. Such a computer program product may be provided on any kind of computer readable medium, e.g., magnetically or optically based medium, or through a computer based network, e.g., the Internet.

It should be noted that the term "actual power" refers to the power actually produced, whilst the term "desired power" refers to the power desired or requested from the wind power plant. The actual and desired powers may relate to active and/or reactive power.

The first, second, third and fourth aspect of the present invention may each be combined with any of the other aspects. These and other aspects of the invention will be apparent from and elucidated with reference to the embodiments described hereinafter.

BRIEF DESCRIPTION OF THE FIGURES

The present invention will now be explained, by way of example only, with reference to the accompanying Figures, where.

Throughout the drawings, like numerals indicate like elements.

DETAILED DESCRIPTION OF AN EMBODIMENT

Figure 1:
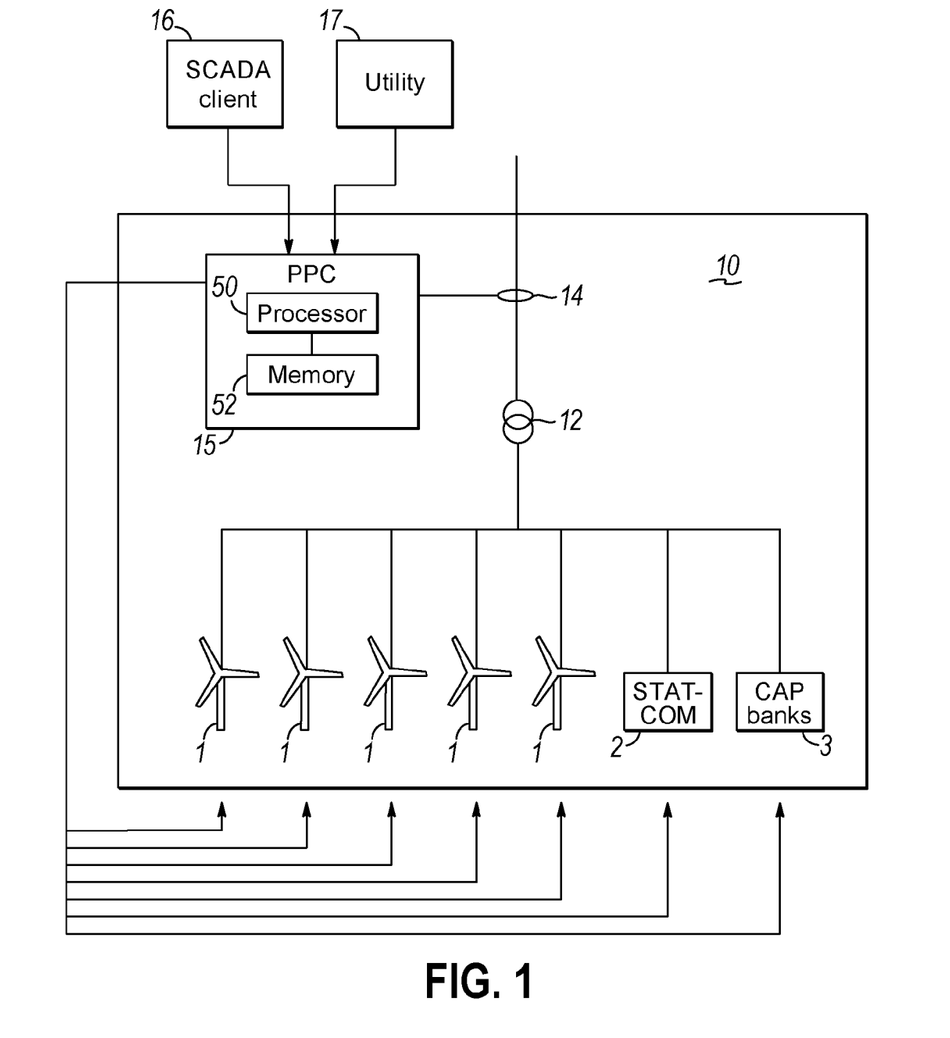
FIG. 1 is a schematic drawing of a wind power plant.

FIG. 1 is a schematic drawing of a wind power plant 10 containing a plurality of wind turbines 1 as well as compensation equipment in the form of a STATCOM 2 and capacitor banks 3. The wind turbines and compensation equipment is connected to a point of common coupling 12 by wires. The wires between the wind turbines and the point of common coupling as well as the wires between the compensation equipment and the point of common coupling may comprise switches in order to disconnect the wind turbines and the compensation equipment, respectively, from the point of common coupling. A grid meter 14 for measuring power production from the wind power plant is arranged close to the point of common coupling 12. The output from the grid meter 14 is input to a power plant controller 15. The power plant controller 15 also receives signals in relation to a desired power output from the wind power plant 10, e.g. from a SCADA network or a utility network. Other inputs in relation to a desired output from the wind power plant 10 may arise from grid codes, or a customer. The power plant references from a SCADA network monitoring the wind power plant may e.g. be due to protection of the wind turbines or other equipment of the wind power plant.

The power plant controller 15 is arranged to determine a desired power reference signal from the signals on desired output from the wind power plant 10. The power plant controller 15 subsequently provides control signals to the wind turbines 1 and compensation equipment 2, 3 (shown by the arrows in FIG. 1) in order for the wind power plant to provide the desired output. This measuring and control is typically performed substantially continuously.

Figure 2:
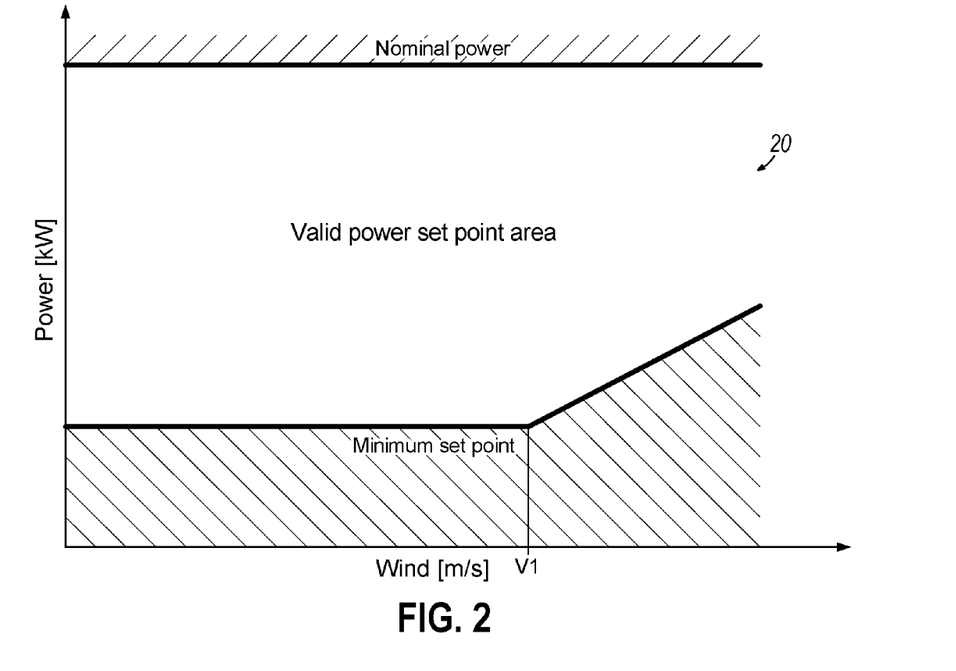
FIG. 2 is a chart showing an example of a first filter characteristic in a first control setup.

FIG. 2 is a chart showing an example of a first filter characteristic 20 in a first control setup. The first filter characteristic is an active power limiting function limiting the setpoints for amount of active power from a wind turbine. At the top, the active power setpoint is limited to the nominal power of the wind turbine. The nominal power of the wind turbine is also denoted the rated power of the wind turbine. The nominal or rated power of a wind turbine is the maximum power thereof. However, this upper limitation may be increased for shorter periods of time, where the wind turbine is the over-rated. The nominal power may e.g. be 2 MW for a wind turbine and is the maximum possible output from the wind turbine. Thus, no setpoints above this limit should be sent to the wind turbine. The active power setpoint is also limited to a minimum setpoint, which is the minimum setpoint a wind turbine should receive due to load constraints. This minimum setpoint is depending on the actual wind speed. One example of the minimum power may be seen from FIG. 2 wherein the minimum setpoint is constant between zero wind speed and the wind speed V1, and wherein it increases substantially linearly from a wind speed V1. The setpoints lying between the maximum and minimum setpoints for a given wind speed are within the valid power setpoint area. The hatched areas of the chart of FIG. 5 indicate areas outside the valid power setpoint area.

Figure 3:
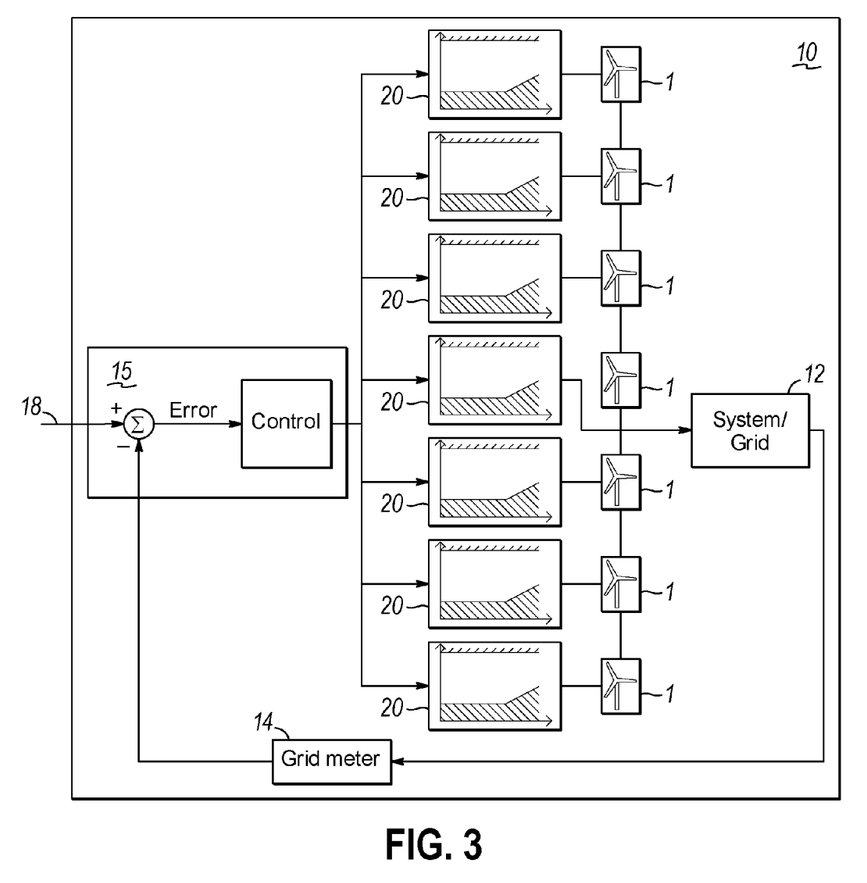
FIG. 3 is a schematic drawing of wind power plant control in accordance with the first control setup.

FIG. 3 is a schematic drawing of wind power plant control in accordance with the first control setup. FIG. 3 shows a wind power plant 10 with a number of wind turbines 1. Each wind turbine 1 receives from a power plant controller 15 a filter characteristic 20 on possible the setpoint ranges so that no wind turbine 1 may be set to operate at setpoints outside the valid setpoint area for a given wind speed. The power from the plurality of the wind turbines 1 is output to the grid at the point of common coupling 15. This output power from the plurality of wind turbines at the point of common coupling is the output power from the wind power plant; a grid meter 14 measures this wind power plant output and inputs the measurement to the power plant controller 15. The power plant controller 15 moreover receives a reference input 18 from e.g. a utility, a customer, a SCADA system, frequency control, trading or system protection. The power plant controller determines an error as the difference between the reference input 18 and the input from the grid meter 14. This error is thus the difference between the reference power and the power actually produced. The power plant controller 15 uses the error with to perform a control in order to determine setpoints for the operating wind turbines 1 within the wind power plant 10, taking into account the present capability of the individual wind turbine 1 and ensuring that all wind turbines may receive only power setpoints within the valid setpoint area as defined by the filter characteristic 20. The control performed may be multiplication by a gain factor. The controller 15 subsequently distributes the resultant setpoints among the operating wind turbines 1 in the wind power plant 10.

Figure 4:
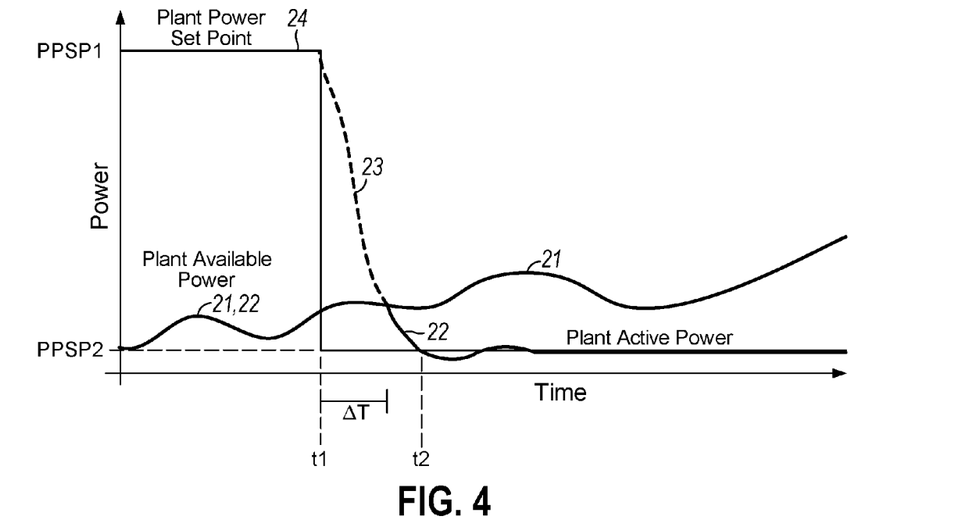
FIG. 4 is a chart showing power plant output when the first control setup is used.

FIG. 4 is a chart showing power plant output when the first control setup is used, i.e. maximum setpoint for the wind turbines 1 of the wind power plant 10 is the nominal power of the wind turbines 1. The chart shows an aggregate power plant setpoint 24 being constant at a value PPSP1 from time zero until time t1. PPSP1 may e.g. correspond to the number of producing wind turbines 1 in the wind power plant 10 multiplied by the nominal power of the individual turbines 1. At time t1, the wind power plant output is constrained and the aggregate maximum plant power setpoint 24 is lowered considerably, to a value PPSP2. The available power from the wind power plant is shown as chart 21. From time zero until time t1, the wind power plant 10 is unconstrained and the output power from the wind power plant 10 equals the available power 21 from the wind power plant. At time t1, the wind power plant 10 becomes constrained to the value PPSP2. It can be seen from FIG. 4 that the value PPSP1 is considerably higher than the available power 21 from the wind power plant. When the wind power plant 10 is constrained to the value PPSP2, the power plant controller sends out derate instructions to one or more of the wind turbines 1. However, since the power plant controller 15 starts out from a setpoint equaling the aggregate power plant setpoint PPSP 1 corresponding to aggregated nominal power of the individual wind turbines, it takes some time before the wind power plant starts reacting, due to the fact that the wind power plant 10 is controlled in accordance with a determination of the error between the reference input 18 and the input from the grid meter 14 (see FIG. 3) and since the ramping down of the setpoints to the individual wind turbines 1 start out from the nominal power of the wind turbines 1. This results in a time delay $\Delta T$ result, before the actual ramping down of the power output of wind power plant 10 is initiated (corresponding to the time t1+$\Delta T$, i.e. the crossing between an aggregate power output setpoint 23 and the available power 24 from the wind power plant). The dotted chart 23 indicates the aggregate power output setpoint from the wind power plant 10 resulting from ramping down the setpoints to the individual wind turbines 1.

The active power actually produced by the wind power plant is denoted by 22. From time zero to time t1, i.e. when the wind power plant 10 is unconstrained, the active power 22 from the wind power plant equals the available power. At time t1, when a constraint is imposed on the wind power plant output, the active power from the wind power plant still equals the available power, until the time t1+$\Delta T$ from which an ramping down of the actual power output from the wind power plant is initiated. At time t2 the active power 22 from the wind power plant has reached the constrained power plant setpoint PPSP 2.

Figure 5:
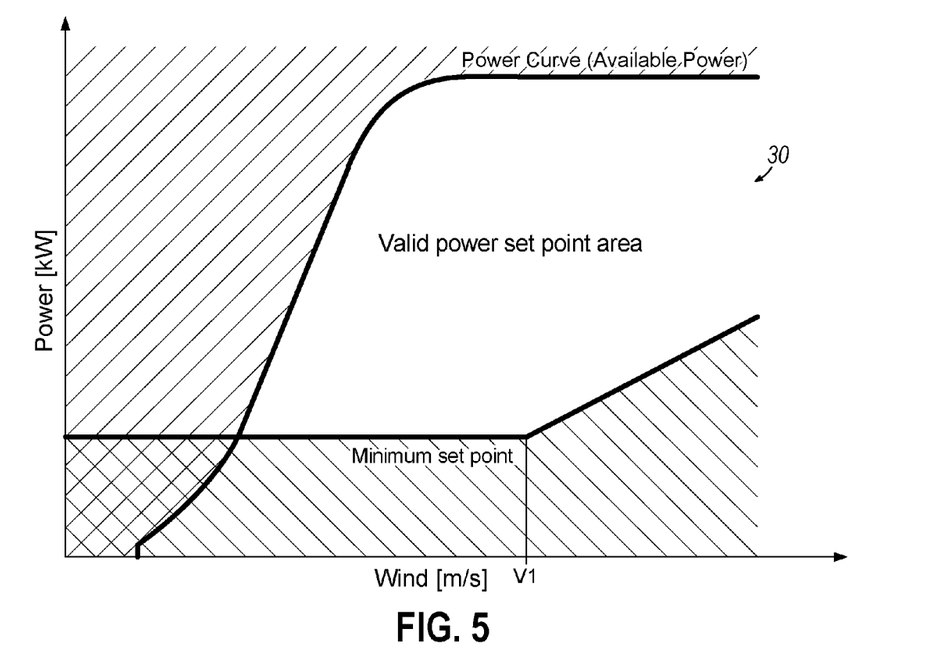
FIG. 5 is a chart showing an example of a second filter characteristic in a second control setup.

FIG. 5 is a chart showing an example of a second filter characteristic 30 in a second control setup. The second filter characteristic is an active power limiting function limiting the setpoints for amount of active power from a wind turbine. Like in the first control setup, the active power setpoint is limited to a minimum setpoint, which is the minimum setpoint a wind turbine should receive due to load constraints. This minimum setpoint is depending on the actual wind speed. It may be seen from FIG. 5 that the minimum setpoint is constant between zero wind speed and the wind speed V1, and that it increases substantially linearly from a wind speed V1. According to the second control setup, the active power is limited at the top to the available power of the wind turbine. The available power is dependant of the actual wind speed at the wind turbine. According to the second control setup, no setpoints above this available power should be sent to the wind turbine. The setpoints lying between the maximum and minimum setpoints for a given wind speed are within the valid power setpoint area. The hatched areas of the chart of FIG. 5 indicate areas outside the valid power setpoint area.

Figure 6:
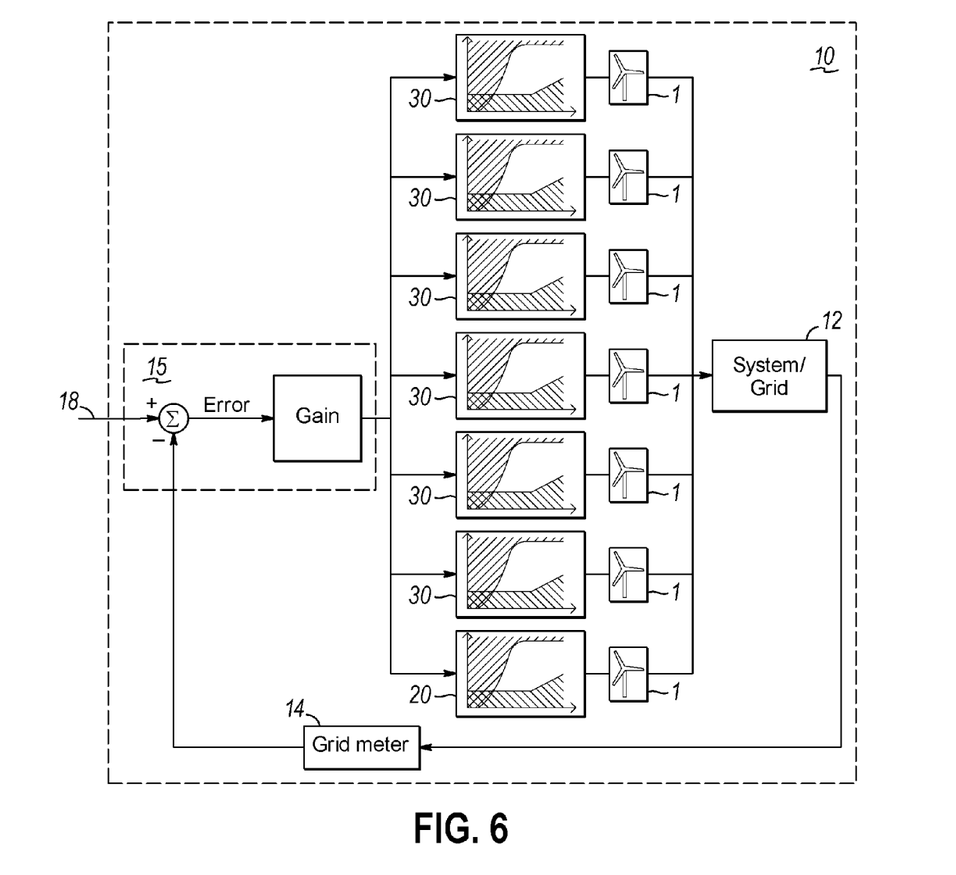
FIG. 6 is a schematic drawing of wind power plant control in accordance with the second control setup.

FIG. 6 is a schematic drawing of wind power plant control in accordance with the second control setup. FIG. 6 shows a wind power plant 10 with a number of wind turbines 1. Each wind turbine 1 receives from a power plant controller 15 a filter characteristic 30 on possible the setpoint ranges so that no wind turbine 1 may be set to operate at setpoints outside the valid setpoint area for a given wind speed. The power from the plurality of the wind turbines 1 is output to the grid at the point of common coupling 15. This output power from the plurality of wind turbines at the point of common coupling is the output power from the wind power plant; a grid meter 14 measures this wind power plant output and inputs the measurement to the power plant controller 15. The power plant controller 15 moreover receives a reference input 18 from e.g. a utility, a customer, a SCADA system, frequency control, trading or system protection. The power plant controller determines an error as the difference between the reference input 18 and the input from the grid meter 14. This error is thus the difference between the reference power and the power actually produced. The power plant controller 15 multiplies the error with a gain factor and distributes the resultant setpoints among all operating wind turbines 1 in the wind power plant 10, taking into account the present capability of the individual wind turbine 1 and ensuring that all wind turbines receive only power setpoints within the valid setpoint area as defined by the filter characteristic 30. The difference between the wind power plant controls of FIG. 3 and FIG. 6 lies in the different filter characteristics 20, 30: the maximum setpoint according to the filter characteristics 20 is the nominal power of the wind turbines, whilst the maximum setpoint according to the filter characteristics 30 is the available power of the wind turbine. The benefit of the filter characteristics 30 is that when the wind power plant 10 receives an instruction to constrain the production, the wind power plant 10 starts responding to the constraint considerably faster compared to if the filter characteristics 20 was used for the wind turbine output. This will be described in more detail in connection with FIG. 7.

Figure 7:
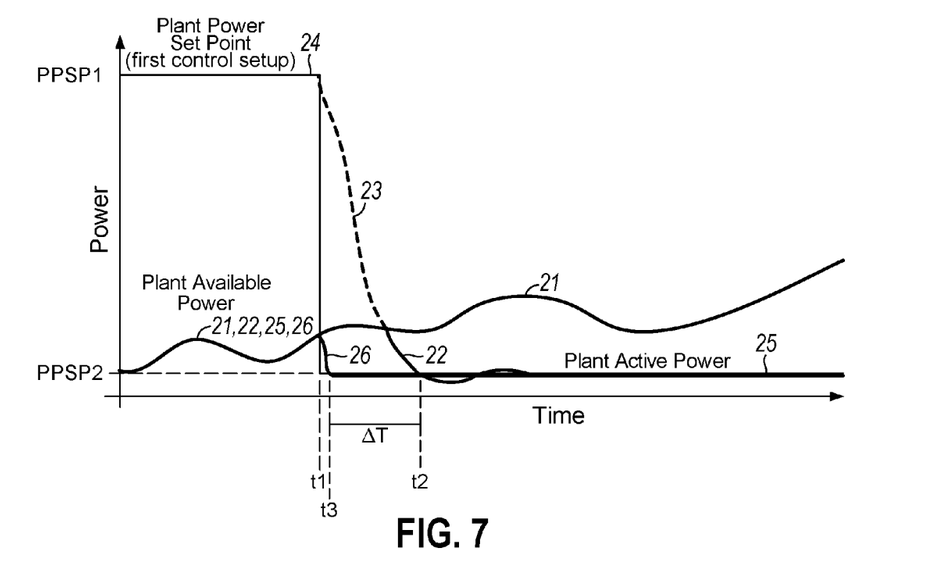
FIG. 7 is a chart showing a reduced power plant output when the second control setup is used.

FIG. 7 is a chart showing a power plant output when the second control setup is used.

According to the second control setup the maximum setpoint for the individual wind turbines 1 of the wind power plant 10 is the available power of the wind turbines 1. For ease of comparison between the power plant output resulting from the first and second control setups, the power plant setpoint 24, the power active power curve 22 as well as the aggregate power output setpoint 23 from FIG. 4 is repeated in FIG. 7. The available power from the wind power plant is shown as chart 21 and the power setpoint for the wind power plant is indicated by the curve 25; the curve 25 corresponds to the curve 21 of the plant available power between time zero and time t1. At time t1, the wind power plant output is constrained to the value PPSP2, which is indicated by the continuation of curve 25 at time t1 to a horizontal line 25. The active power actually produced by the wind power plant is denoted by 26.

In accordance with the second control setup, the maximum setpoint for the wind power plant 10 set to the available power 21 from the wind power plant. The available power 21 from the wind power plant depends on the wind speed at the individual wind turbines 1 and corresponds to the sum of the available power from the operating wind turbines 1.

At time t1, the wind power plant output is constrained and the aggregate maximum plant power setpoint 25 is lowered to the value PPSP2. From time zero until time t1, the wind power plant 10 is unconstrained and the output power from the wind power plant 10 equals the available power 21 from the wind power plant. At time t1, the wind power plant 10 becomes constrained to the value PPSP2.

From time zero to time t2, i.e. when the wind power plant 10 is unconstrained, the active power 26 from the wind power plant equals the available power. At time t2, when a constraint is imposed on the wind power plant output, to the value PPSP2, the power plant controller sends out derate instructions to one or more of the wind turbines 1. Since the power plant controller 15 starts out from a setpoint equaling the available power plant power, the wind power plant starts reacting substantially immediately. At time t3 the active power 26 output from the wind power plant 10 has reached the constrained wind power plant setpoint set at the value PPSP2 (curve 25 after the time t1).

The time difference ΔT1 indicates the difference in response time between the wind power plant being operated at the first control setup and the second control setup. ΔT1 thus indicates the improvement in reaction time when the second control setup is used.

Figure 8:
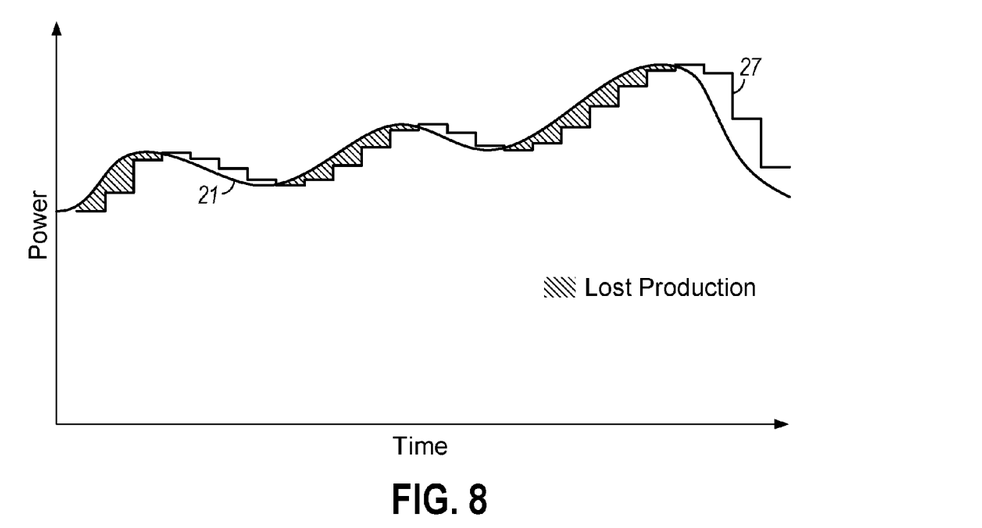
FIG. 8 is a chart showing production loss when the second control setup in accordance with the second filter characteristic is used.

FIG. 8 is a chart showing production loss when the second control setup in accordance with the second filter characteristic is used. When the wind power plant is controlled by the second control setup, the reaction time in the event of a constraint on the output power is considerably less compared to the instant of the wind power plant being controlled by the first control setup. However, some disadvantages exist in relation to the second control setup. When the power plant controller 10 sends out active power setpoints to the wind turbines 1, which are limited to the currently available power of the individual wind turbines 1, it takes some time before the wind turbines 1 receives a new, updated active power setpoint. If the wind speed increases in this time between two active power setpoints from the power plant controller 10, the wind turbine 1 is stuck with an old active power setpoint that does not allow the wind turbine 1 to produce as much power as the currently available power. Thus, until the wind turbine 1 receives a new, updated active power setpoint, it is effectively curtailed and looses active power production. Moreover, due to communication and scanning delays from the power plant controller and a SCADA system and back again, any active power setpoint received by the individual wind turbines 1 is already old when it is received by the wind turbines 1. The above is illustrated in FIG. 8, where the curve 21 indicates the available power from the wind power plant and the stepwise curve 27 indicates the power setpoint for the wind power plant. As indicated by the figure legend, the hatched sections in FIG. 8 represent lost production.

It should be noted, that at favorable wind conditions where the available power is equal to nominal power, there is no issue of lost production due to outdated power setpoints. Moreover, when the wind is decreasing, the problem of lost production does not appear either. However, the problem of lost production is quite severe and may add up to about loosing about 5% of the available production due to the use of the second control setup.

Figure 9:
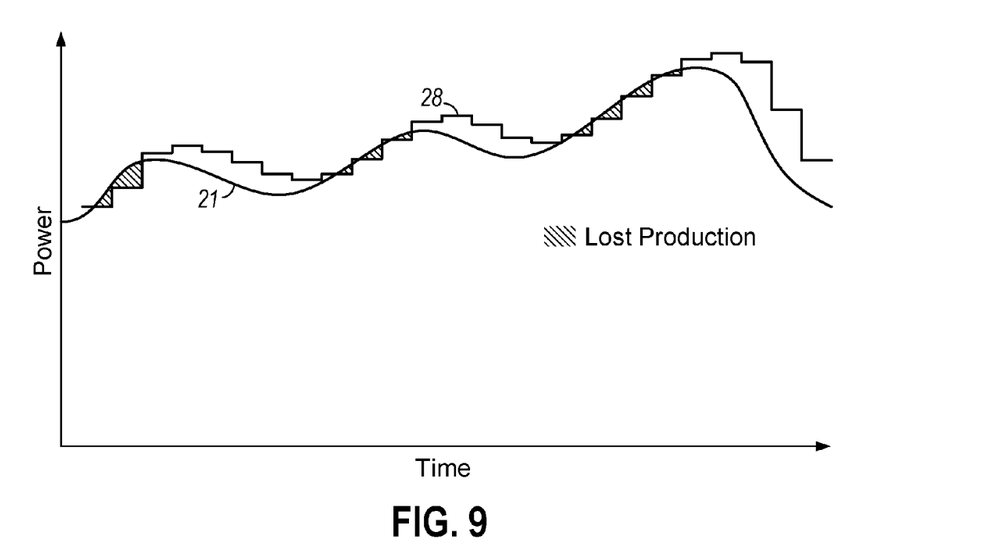
FIG. 9 is a chart showing reduced production losses when a third control setup is used.

FIG. 9 is a chart showing reduced production losses when a third control setup is used. T curve 21 indicates the available power from the wind power plant and the stepwise curve 28 indicates the power setpoint for the wind power plant. The power setpoint from the wind power plant is set to a value that is greater than the wind power plant available power. The values on curve 28 may e.g. correspond to a certain percentage above the available power, such as 105% of the available power, or to an absolute value above the available power, such as "available power plus a few 100 kW".

As in FIG. 8, the hatched sections in FIG. 9 represent lost production. The available power curves 21 of FIGS. 8 and 9 are identical. It may be seen that the amount of lost power is reduced considerably when the third control setup is used, compared with the second control setup.

Figure 10:
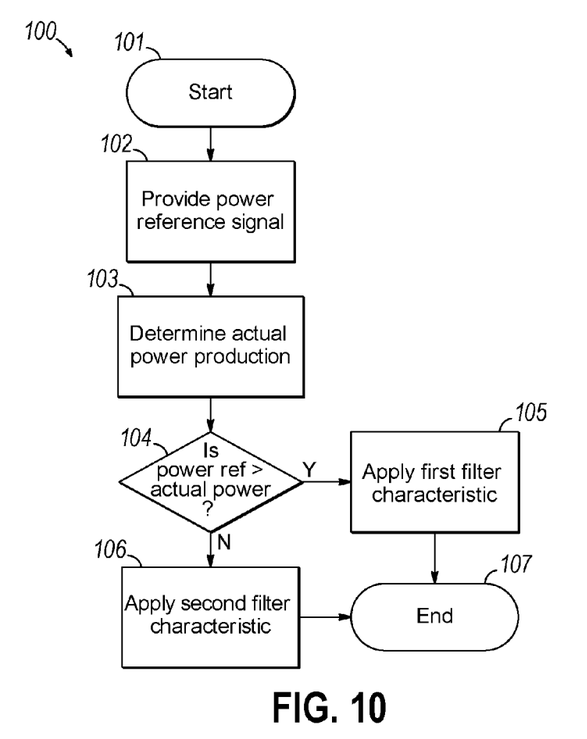
FIG. 10 is a flow-chart of a method according to the invention.

FIG. 10 is a flowchart of a method 100 according to the invention. The method 100 is a method for controlling a wind power plant 10 comprising a plurality of wind turbines 1 being operatively connected to a plant collector grid at a point of common coupling 12. The method starts at step 101 and continues to step 102, wherein a desired power reference signal is provided. The desired power reference signal corresponds to the desired output from the wind power plant 10, e.g. as a consequence of one or more of the following: grid codes, a utility network, a customer or from a SCADA network monitoring the wind power plant, e.g. due to protection of the wind turbines or other equipment of the wind power plant. At the subsequent step 102, the power production of the wind power plant 10 is determined and an actual power reference signal is determined in response to the determined power production. The determination of the power production of the wind power plant 10 is e.g. performed by means of the grid meter 14 (see FIG. 1). In the subsequent step 103, the desired power reference signal is compared with the actual power reference signal, and it is determined whether the power reference signal is exceeding the actual power reference signal. This situation corresponds to the situation where the error determined by the power plant controller 15 in FIG. 1 is positive. If this is the case, the method continues to step 105, where a first filter characteristic is applied as part of a generation of a wind turbine. In the opposite case, i.e. if the actual power reference signal exceeds the desired power reference signal, corresponding to the situation where the error determined by the power plant controller 15 is negative, a second filter characteristic as part of the generation of the wind turbine power reference is applied. The first filter characteristic is different from the second filter characteristic.

As an example, the first filter characteristic comprises a maximum setpoint curve corresponding substantially to the nominal power of the wind turbine whilst the second filter characteristic comprises a maximum setpoint curve depending on the actual power produced by the wind turbine or the available power for the wind turbine. Thus, if the wind power plant is producing less than the required amount of power (corresponding to a positive error), the power plant controller will send out setpoints corresponding to the first filter characteristic, viz. within a valid power setpoint area in FIG. 2. However, if the wind power plant is producing more than the required amount of power (corresponding to a negative error), the power plant controller sends out setpoints corresponding to the second filter characteristic, e.g. within a valid power setpoint area in FIG. 5 corresponding to the second control setup, below a maximum setpoint curve depending on the average actual power produced by the wind turbine over a predetermined amount of time or within a valid power setpoint area corresponding to the third control setup.

Thus, the sign of the error is taken into account so that when no derate instruction exists, the wind power plant is controlling the wind turbines in accordance with the first filter characteristic, corresponding to the way the wind turbines were originally designed, whereby the negative effects in relation use of the second or third control setups (i.e. loss of production, increased loads, increased pitching activity) are eliminated. Typically, this will be the predominant situation. However, when a derate instruction is received, the power plant controller immediately changes control strategy, applying a second filter characteristic as part of the generation of the wind turbine power reference, e.g. within a valid power setpoint area in FIG. 5 corresponding to the second control setup, below a maximum setpoint curve depending on the average actual power produced by the wind turbine over a predetermined amount of time or within a valid power setpoint area corresponding to the third control setup. By the immediate change of control strategy, the disadvantage of using the first control strategy, viz. the delay in time before the wind power plant started reacting to a derate instruction, may be alleviated considerably. Thus, taking the sign of the error into account renders it possible to alleviate the disadvantages of the different control setups.

Both the first filter characteristic and the second filter characteristic comprise a minimum setpoint curve depending on a prevailing wind speed.

Figure 11:
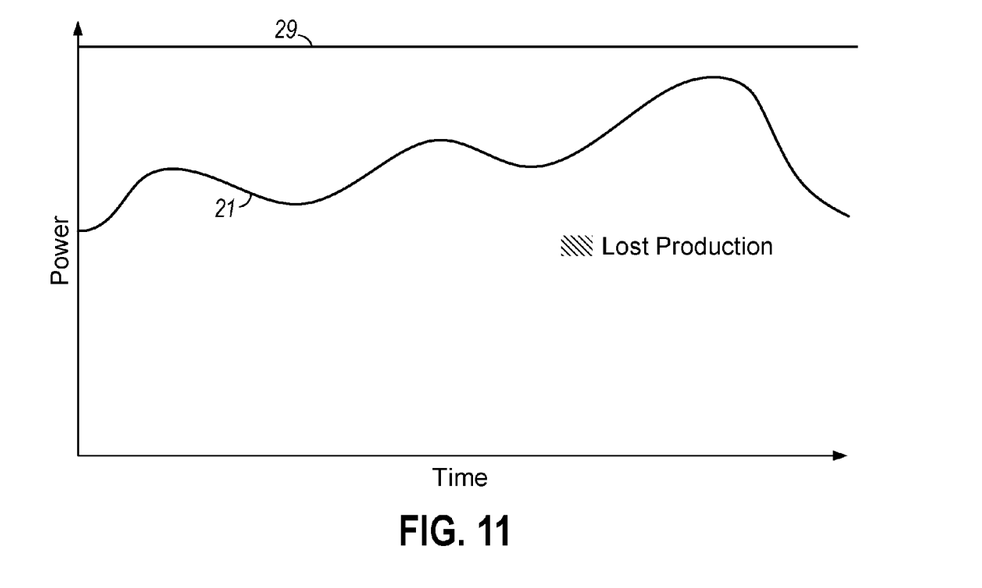
FIG. 11 is a chart showing that no production losses occur when the method for controlling a wind power according to the invention is used.

FIG. 11 is a chart showing that no production losses occur when the method for controlling a wind power according to the invention is used. The curve 21 indicates the available power from the wind power plant and the horizontal line 29 indicates the power setpoint for the wind power plant. Typically, the power setpoint for the wind power plant corresponds to the number of wind turbines multiplied by their nominal power. If the wind power plant comprises different models of wind turbines having different nominal powers, the power setpoint for the wind power plant corresponds to a sum of the number of wind turbines of each model multiplied by the nominal power of the corresponding models. As in FIGS. 8 and 9, hatched sections represent lost production. However, it may be observed in FIG. 11, hatched sections are absent, which illustrates that the problem of lost production is solved when the method for controlling a wind power according to the invention is used.

The invention can be implemented in any suitable form including hardware, software, firmware or any combination of these. The invention or some features of the invention can be implemented as computer software running on one or more data processors and/or digital signal processors. The elements and components of an embodiment of the invention may be physically, functionally and logically implemented in any suitable way. Indeed, the functionality may be implemented in a single unit, in a plurality of units or as part of other functional units. As such, the invention may be implemented in a single unit, or may be physically and functionally distributed between different units and processors.

As will be appreciated by one skilled in the art, the embodiments of the invention may also be embodied in a computer program product embodied in at least one computer readable storage medium having computer readable program code embodied thereon. The computer readable storage medium may be an electronic, magnetic, optical, electromagnetic, infrared, or semiconductor system, apparatus, or device, or any suitable combination thereof, that can contain, or store a program for use by or in connection with an instruction execution system, apparatus, or device. Exemplary computer readable storage media include, but are not limited to, a hard disk, a floppy disk, a random access memory, a read-only memory, an erasable programmable read-only memory, a flash memory, a portable compact disc read-only memory, an optical storage device, a magnetic storage device, or any suitable combination thereof. Computer program code for carrying out operations for the embodiments of the present invention may be written in one or more object oriented and procedural programming languages.

The methods described herein can be implemented by computer program instructions supplied to the processor of any type of computer to produce a machine with a processor that executes the instructions to implement the functions/acts specified herein. These computer program instructions may also be stored in a computer readable medium that can direct a computer to function in a particular manner. To that end, the computer program instructions may be loaded onto a computer to cause the performance of a series of operational steps and thereby produce a computer implemented process such that the executed instructions provide processes for implementing the functions/acts specified herein.

The power plant controller 15 is a supervisory control system that can be implemented using at least one processor 50 selected from microprocessors, microcontrollers, microcomputers, digital signal processors, central processing units, field programmable gate arrays, programmable logic devices, state machines, logic circuits, analog circuits, digital circuits, and/or any other devices that manipulate signals (analog and/or digital) based on operational instructions that are stored in a memory 52. The memory 52 may be a single memory device or a plurality of memory devices including but not limited to random access memory (RAM), volatile memory, non-volatile memory, static random access memory (SRAM), dynamic random access memory (DRAM), flash memory, cache memory, and/or any other device capable of storing digital information. The power plant controller 15 may include a mass storage device comprising one or more hard disk drives, floppy or other removable disk drives, direct access storage devices (DASD), optical drives (e.g., a CD drive, a DVD drive, etc.), and/or tape drives, among others.

The processor 50 of the power plant controller 15 operates under the control of an operating system, and executes or otherwise relies upon computer program code embodied in various computer software applications, components, programs, objects, modules, data structures, etc. The computer program code residing in memory 52 and stored in the mass storage device also includes a control algorithm that, when executing on the processor 50, controls and manages the wind power plant 10 as described and shown herein. For example, the control algorithm may comprise the flowchart of the computer-implemented method 100 (FIG. 10). The computer program code typically comprises one or more instructions that are resident at various times in memory 52, and that, when read and executed by the processor 50, causes the power plant controller 15 to perform the steps necessary to execute steps or elements embodying the various embodiments and aspects of the invention.

Various program code described herein may be identified based upon the application within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

The power plant controller 15 may include a human machine interface (HMI) that is operatively connected to the processor 50 in a conventional manner. The HMI may include output devices, such as alphanumeric displays, a touch screen, and other visual indicators, and input devices and controls, such as an alphanumeric keyboard, a pointing device, keypads, pushbuttons, control knobs, etc., capable of accepting commands or input from the operator and transmitting the entered input to the processor 50.

Although the present invention has been described in connection with the specified embodiments, it is not intended to be limited to the specific form set forth herein. Rather, the scope of the present invention is limited only by the accompanying claims. In the claims, the term "comprising" does not exclude the presence of other elements or steps. Additionally, although individual features may be included in different claims, these may possibly be advantageously combined, and the inclusion in different claims does not imply that a combination of features is not feasible and/or advantageous. In addition, singular references do not exclude a plurality. Thus, references to "a", "an", "first", "second" etc. do not preclude a plurality. Furthermore, reference signs in the claims shall not be construed as limiting the scope.

The invention claimed is:

1. A method for controlling a wind power plant including a plurality of wind turbines operatively connected to a power grid, the method comprising:
   generating an actual power reference signal reflecting a current power production of the wind power plant;
   comparing a desired power reference signal with the actual power reference signal;
   applying to each of the plurality of wind turbines a respective first valid power setpoint area when the desired power reference signal exceeds the actual power reference signal; and
   applying to each of the plurality of wind turbines a respective second valid power setpoint area when the actual power reference signal exceeds the desired power reference signal,
   wherein the respective first valid power setpoint area and the respective second valid power setpoint area differ, and are bounded by a common lower limit depending on a prevailing wind speed.

2. The method of claim 1, wherein the respective first valid power setpoint area comprises an upper limit defined by a maximum setpoint curve corresponding substantially to the nominal power of the wind turbine.

3. The method of claim 1, wherein the respective first valid power setpoint area comprises a lower limit defined by a minimum setpoint curve depending on a prevailing wind speed.

4. The method of claim 1, wherein the respective second valid power setpoint area comprises an upper limit defined by a maximum setpoint curve depending on the actual power produced by a corresponding wind turbine.

5. The method of claim 4, wherein the maximum setpoint curve of the respective second valid power setpoint area depends on an average power value of actual power produced by the wind turbine over a predetermined amount of time.

6. The method of claim 1, wherein the respective second valid power setpoint area comprises an upper limit defined by a maximum setpoint curve corresponding to the available power for a corresponding wind turbine.

7. The method of claim 1, wherein the respective second valid power setpoint area comprises a lower limit defined by a minimum setpoint curve depending on a prevailing wind speed.

8. The method of claim 1, wherein the respective first valid power setpoint area is applied when the actual power reference signal equals the desired power reference signal.

9. The method of claim 1, wherein the respective second valid power setpoint area is applied when the actual power reference signal equals the desired power reference signal.

10. A computer program product comprising:
    a non-transitory computer readable storage medium; and
    program instructions for performing the method of claim 1, wherein the program instructions are stored on the non-transitory computer readable storage medium.

11. A controller for a wind power plant including a plurality of wind turbines operatively connected to a power grid, the controller comprising:
- a processor; and
- program code configured to, when executed by the processor, perform an operation, comprising:
  - generating an actual power reference signal reflecting a current power production of the wind power plant;
  - comparing a desired power reference signal with the actual power reference signal;
  - applying to each of the plurality of wind turbines a respective first valid power setpoint area when the desired power reference signal exceeds the actual power reference signal; and
  - applying to each of the plurality of wind turbines a respective second valid power setpoint area when the actual power reference signal exceeds the desired power reference signal,
  - wherein the respective first valid power setpoint area and the respective second valid power setpoint area differ, and are bounded by a common lower limit depending on a prevailing wind speed.

12. The wind power plant controller of claim 11, wherein the first valid power setpoint area comprises an upper limit defined by a maximum setpoint curve corresponding substantially to the nominal power of the wind turbine.

13. The wind power plant controller of claim 11, wherein the respective first valid power setpoint area comprises a lower limit defined by a minimum setpoint curve depending on a prevailing wind speed.

14. The wind power plant controller of claim 11, wherein the respective second valid power setpoint area comprises an upper limit defined by a maximum setpoint curve depending on the actual power produced by a corresponding wind turbine.

15. The power plant controller of claim 14, wherein the maximum setpoint curve of the respective second valid power setpoint area depends on an average power value of actual power produced by the wind turbine over a predetermined amount of time.

16. The wind power plant controller of claim 11, wherein the respective second valid power setpoint area comprises an upper limit defined by a maximum setpoint curve corresponding to the available power for a corresponding wind turbine.

17. The wind power plant controller of claim 11, wherein the respective second valid power setpoint area comprises a lower limit defined by a minimum setpoint curve depending on a prevailing wind speed.

18. The wind power plant controller of claim 11, wherein the respective first valid power setpoint area is applied when the actual power reference signal equals the desired power reference signal.

19. The wind power plant controller of claim 11, wherein the respective second valid power setpoint area is applied when the actual power reference signal equals the desired power reference signal.

20. A wind power plant comprising:
- a plurality of wind turbines operatively connected to a power grid; and
- a controller comprising:
  - a processor; and
  - program code configured to, when executed by the processor, perform an operation, comprising:
    - generating an actual power reference signal reflecting a current power production of the wind power plant;
    - comparing a desired power reference signal with the actual power reference signal;
    - applying to each of the plurality of wind turbines a respective first valid power setpoint area when the desired power reference signal exceeds the actual power reference signal; and
    - applying to each of the plurality of wind turbines a respective second valid power setpoint area when the actual power reference signal exceeds the desired power reference signal,
    - wherein the respective first valid power setpoint area and the respective second valid power setpoint area differ, and are bounded by a common lower limit depending on a prevailing wind speed.

* * * * *